J. POWELL.

LUBRICATOR.

No. 10,728. Reissued May 18, 1886.

Attest.
Geo. Stimmel.
James Moore

Inventor.
James Powell
by James L. Layman
Atty.

UNITED STATES PATENT OFFICE.

JAMES POWELL, OF CINCINNATI, OHIO.

LUBRICATOR.

SPECIFICATION forming part of Reissued Letters Patent No. 10,728, dated May 18, 1886.

Original No. 332,623, dated December 15, 1885. Application for reissue filed March 15, 1886. Serial No. 195,356.

*To all whom it may concern.*

Be it known that I, JAMES POWELL, of Cincinnati, in the county of Hamilton and State of Ohio, have invented certain new and useful Improvements in Lubricators; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The object of my present invention is to simplify the construction and thereby diminish the cost of manufacturing those devices which employ a spring-actuated plunger for effecting a discharge of "grease" or other turgid lubricant from a suitable cup, fount, or reservoir.

The improved device is accordingly composed of but five members or parts—to wit, the cup or fount, a screw-threaded hood or cover that engages therewith, a plunger or piston that ejects the grease, a spring that induces a regular and automatic action of said plunger, and a cut-off or regulator that controls the discharge of the turgid lubricant. The cup is accurately bored out to receive the plunger, which latter is a plain disk snugly fitted within the cup, but entirely devoid of packing. This unpacked piston is operated by a spring coiled around a stem that passes through the hood or cover, the latter being preferably threaded internally to engage with an external screw of the reservoir, although this arrangement may be exactly reversed, if desired; but whichever arrangement is adopted both screws may, in the cheaper grades, be cast at the time the fount and hood or cover are made, thereby dispensing with the tedious and expensive chasing or tapping operations heretofore employed for this purpose.

Figure 1:
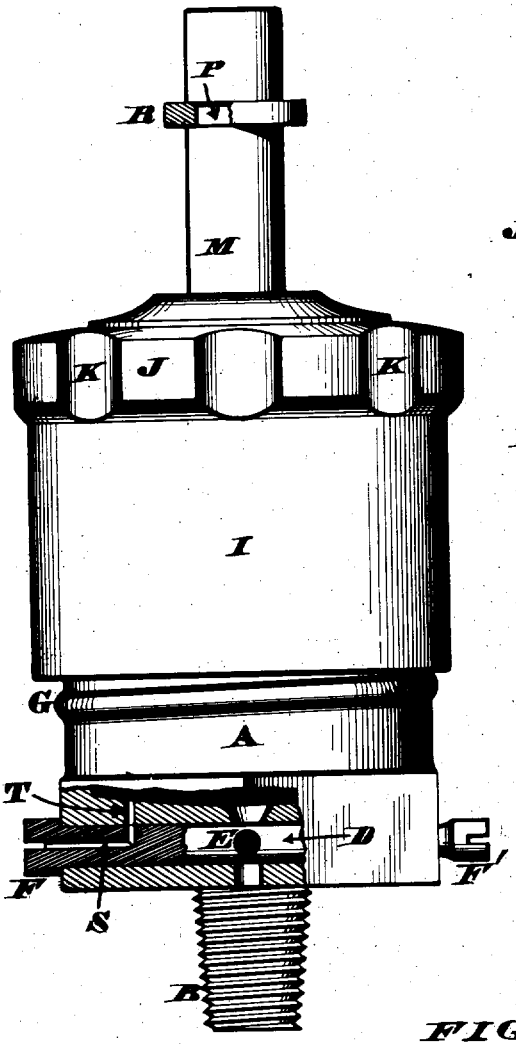
Figure 2:
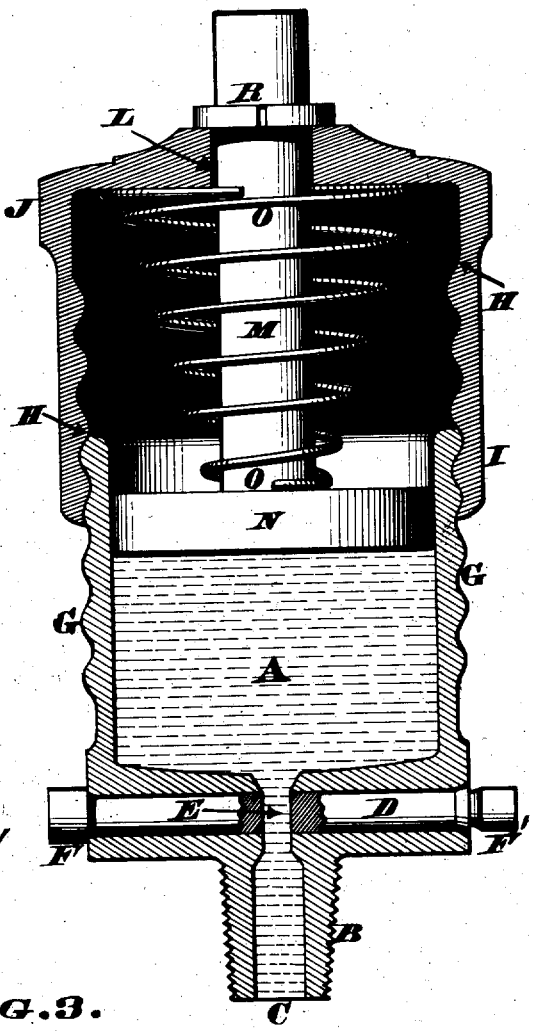
Figure 3:
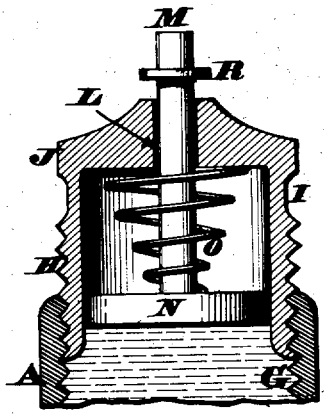

In the annexed drawings, Figure 1 is a sectionized elevation of my improved lubricator, the hood or cover being screwed down almost to the bottom of the reservoir, the piston being raised and the cut-off closed. Fig. 2 is an axial section of the device, the hood or cover being elevated, the stop-ring in contact therewith, and the cut-off open. Fig. 3 is an axial section of a modification of the invention.

A represents the cylindrical fount, cup, or reservoir, having a screw-threaded shank, B, provided with a discharge-passage, C, above which latter is located the regulator or cut-off D, pierced transversely at E, and terminating with nicked ends or heads F F′, for the reception of a screw-driver or other convenient implement. The fount is screw-threaded externally, as at G, to permit the engagement of the internal thread, H, of the hood or cover I, which cover has an annular flange or other enlargement, J, notched or fluted at K, to afford a secure and convenient hold in manipulating said hood or cover. Furthermore, the hood or cover is pierced centrally, as at L, to permit free play of the rod or stem M of the plunger or piston N, which latter is preferably a plain metallic disk, and is usually cast in one piece with its stem, said stem being made to project outwardly through the cover for the purpose of indicating the exact level of the contents of the cup. Applied around this stem, and interposed between the plunger N and cover, is a spring, O, whose coils increase in diameter toward the top of the lubricator. Stem M is grooved circumferentially near its upper end, as at P, to receive a ring or collar, R, that serves as a stop, as more fully described hereinafter. S represents an air-channel, bored in one end of the cut-off D to a short distance within the internal diameter of the cup A, then at right angles to port E of said cut-off. Said air-channel is made to coincide with a small opening or hole, T, in the base of said cup, to afford ventage to the same while withdrawing the piston preparatory to refilling the cup; but before this is done the cut-off is properly turned so as to bring the short branch of channel S diametrically opposite the opening T, thereby preventing escape of grease through the latter. Before charging this lubricator, the cut-off D is first turned so as to bring the nicks in the heads F F′ to the horizontal position seen in Fig. 1, which act causes the port E to assume a similar position, thereby closing said discharge-passage. The hood or cover I is then unscrewed from the fount A, and the plunger N readily withdrawn from said vessel or reservoir, on account of the ring R bearing against the upper end of said hood or cover. The reservoir is now charged with grease or other turgid lubricant, and the hood is again engaged with the fount, and as soon as the cut-off D is turned so as to bring its port E in line with the discharge-passage C, said grease begins to escape through said passage. This discharge of grease is due to the pressure of spring O against the ejecting-piston N, which spring causes the latter to descend gradually within the cup A; but as soon as the ring R comes in contact with the hood I, as seen in Fig. 2, the action of said spring ceases, and thus gives notice to the engineer that the lubricator is inoperative for the time being. The notched collar J K is then grasped, and the cover I is screwed down to impart a renewed tension to the spring O, and thereby cause a restoration of the forced feed, these operations being repeated until the reservoir A is entirely exhausted. From this description it will be apparent that the action of the piston is controlled wholly by the hood or cover of the lubricator, thus dispensing with special adjusting devices, such as have heretofore been customary. Consequently the cost of manufacture is materially reduced, and as the threads G H in the cheaper grades of goods are cast when the fount A and hood I are made, the cost is still further reduced, because said cast screws obviate the usual chasing or tapping of threads around and within these members of a lubricator.

In the modification (seen in Fig. 3) the thread G of the reservoir A is internal, while the screw H of hood I is external, thus exactly reversing the construction shown in the preceding illustration. Again, it will be noticed that the plunger (seen in Fig. 3) traverses the cover, not the reservoir; but the principle of operation is the same, inasmuch as the simple turning of said cover imparts the requisite tension to the spring that actuates the plunger, because the grease is forced up into the cover, while the screw-threads, being fitted sufficiently close, prevents the escape or waste of grease around the same.

The stop-ring may, if preferred, be displaced by a simple pin driven or screwed transversely through the stem M.

I claim as my invention—

1. The combination, in a grease-cup, of a fount or reservoir having a discharge-passage, a spring-actuated piston for effecting a forced feed of the turgid lubricant, a cut-off for regulating the discharge of the same, and a hood or cover, which is screwed to said fount and imparts the tension to said spring, substantially as described.

2. The combination, in a grease-cup, of a fount or reservoir having a discharge-passage, a spring-actuated piston for effecting a forced feed of the turgid lubricant, a hood or cover which is screwed to said fount and imparts the tension to said spring, and a stem or rod projecting outwardly from said hood to indicate the exact level of the grease, as herein described.

3. The combination in a grease-cup, of a fount or reservoir having a discharge-passage, a spring-actuated piston for effecting a forced feed of the turgid lubricant, a hood or cover which is screwed to said fount and imparts the tension to said spring, and a stop applied to the outer end of the piston-rod, for the purpose specified.

4. The combination, in a grease-cup, of a fount or reservoir having a discharge-passage, a piston for effecting a delivery of the turgid lubricant, and a spring surrounding the rod of said piston and interposed between the latter and a hood or cover, said cover being screwed to said reservoir and serving to impart the tension to said coiled spring, substantially as herein described.

5. A grease-cup composed of the following elements: a fount or reservoir, A, hood or cover I, piston N M, spring O, regulator D, discharge passage or port E C, and stop R, substantially as herein described.

6. The combination, in a grease-cup, of a fount or reservoir having a discharge-passage, a spring-actuated piston for effecting a forced feed of the turgid lubricant, a cut-off for regulating the discharge of the same, and an air-vent located within said cut-off, for the purpose described.

In testimony whereof I affix my signature in presence of two witnesses.

JAMES POWELL.

Witnesses:
JAMES H. LAYMAN,
SAML. S. CARPENTER.